United States Patent

[11] 3,543,864

[72] Inventors Philip D. Wenzel
Rockford;
Gerald L. Gallagher, Loves Park, Illinois
[21] Appl. No. 763,204
[22] Filed Sept. 27, 1968
[45] Patented Dec. 1, 1970
[73] Assignee J.I. Case Company
a corporation of Wisconsin

[54] TAIL WHEEL LIFTING MECHANISM
7 Claims, 4 Drawing Figs.
[52] U.S. Cl. .................................................. 172/285,
172/413; 280/4323
[51] Int. Cl. ..................................................... A01b 69/00,
A01b 63/18
[50] Field of Search ........................................... 172/285,
282, 484, 417, 400, 284, 421, 314, 407;
280/43.22, 43.23

[56] References Cited
UNITED STATES PATENTS
2,981,344 4/1961 Roberson ..................... 172/417X
3,061,020 10/1962 Mannheim ................... 172/285
3,204,352 9/1965 Hughes........................ 172/484X
3,228,484 1/1966 Arnold et al................. 172/417X Primary Examiner—Robert E. Bagwill
Assistant Examiner—Stephen C. Pellegrino
Attorney—Dressler, Goldsmith, Clement & Gordon ABSTRACT: A tillage implement including a frame having hitch means at the forward end thereof for connection to a tractive vehicle, and a tail wheel at the rearward end thereof, which is steered in response to turning movement of the tractive vehicle. During a normal plowing operation, the tail wheel is positioned at a slight lead angle toward the plowed ground to compensate for side draft forces. Hydraulic cylinder means is connected between the implement frame and the tail wheel for lowering the tail wheel to lift the implement frame from the normal plowing position to a transport position. Compensating linkage means connects the tail wheel to the implement frame in a manner such that the tail wheel lead angle is eliminated when the implement is raised to the transport position, so that lateral movement of the plow is eliminated during transportation thereof.

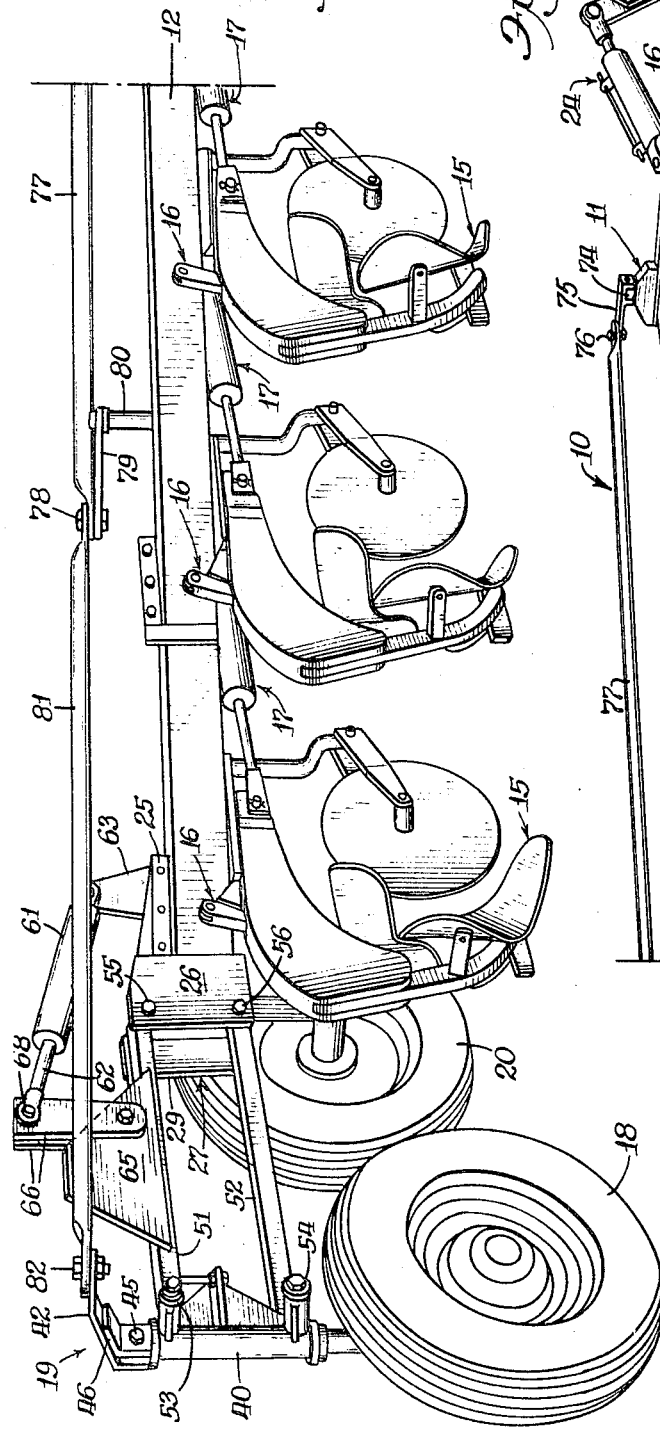
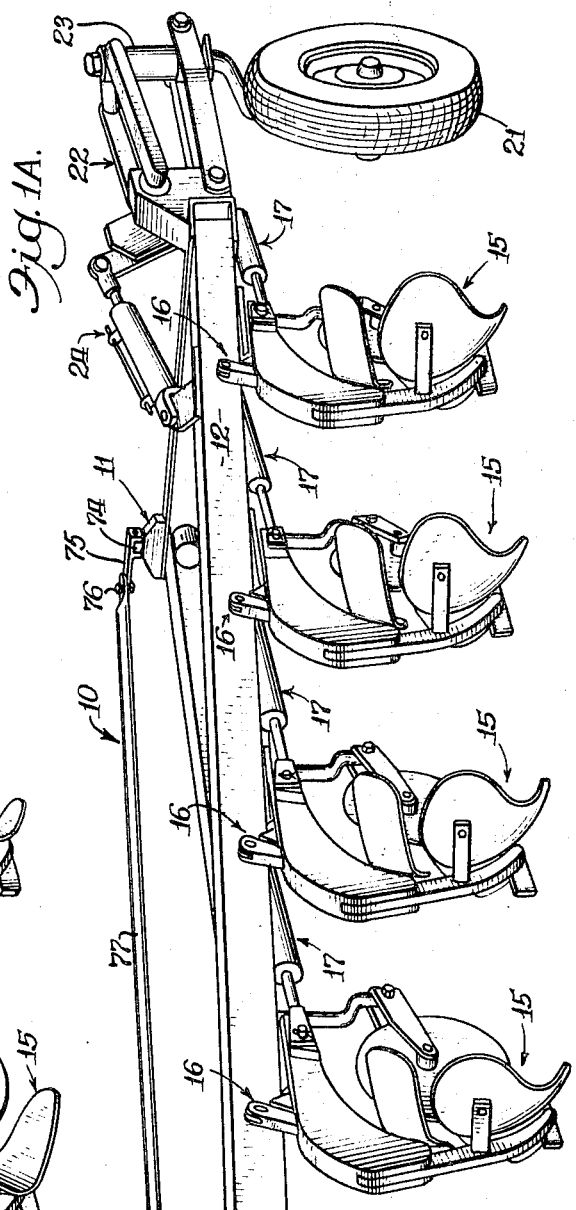

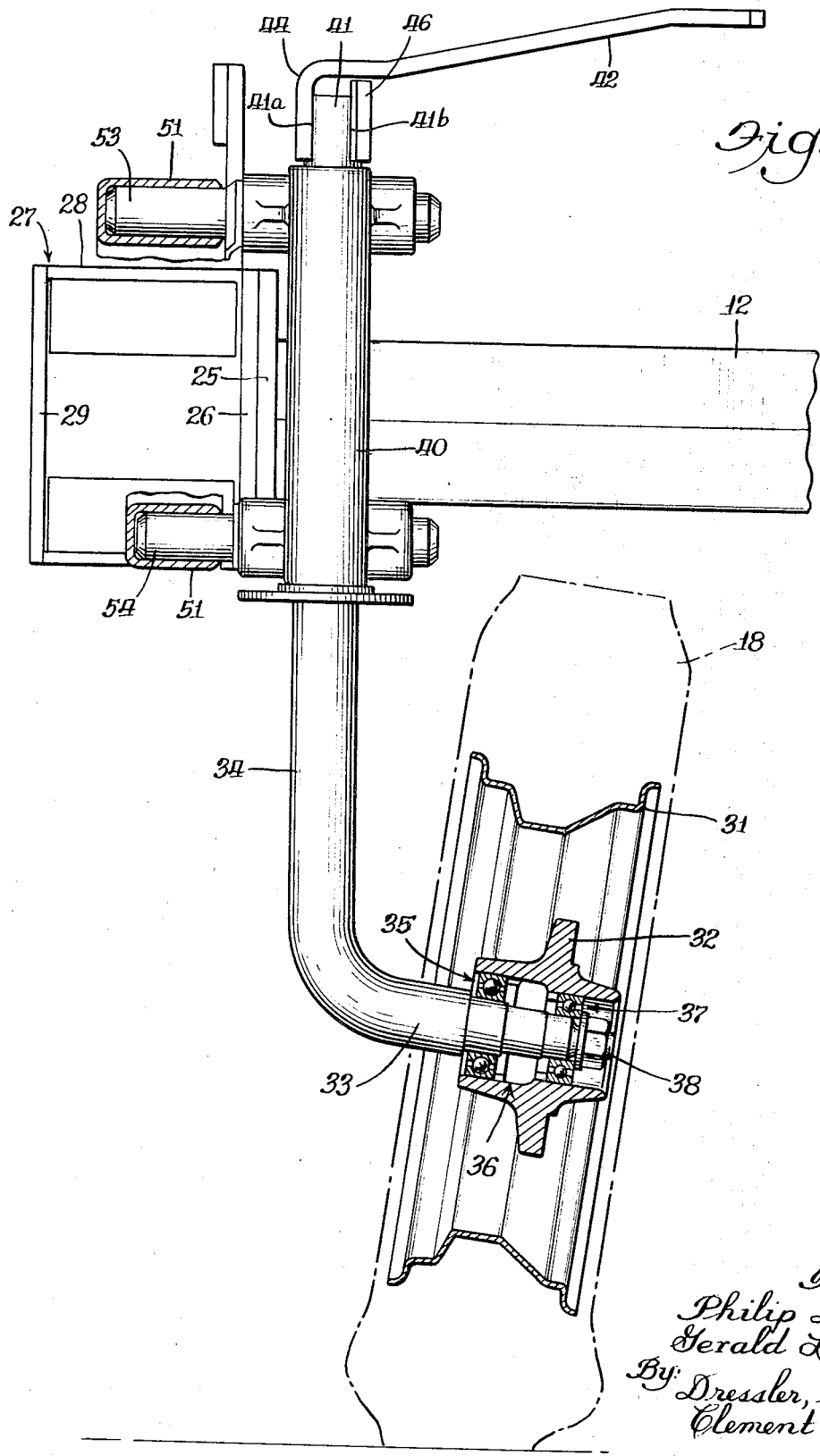

3,543,864

1

TAIL WHEEL LIFTING MECHANISM

BACKGROUND OF THE INVENTION

Heretofore, steerable tail wheels have been commonly provided in connection with tillage implements for controlling movement of the tillage implement in response to turning of a tractor. The steering mechanisms have commonly included a first steering link connected at one end to a forward steering arm that is moved in response to turning of the tractor. The opposite end of the first steering link is connected to an intermediate steering arm, with one end of a second steering link being connected to the second steering arm and the other end of the second steering link being connected to a rearward steering arm for controlling movement of the tail wheel. It has also been conventional to position the tail wheel at a slight lead angle (the horizontal angle between the tail wheel and the direction of movement of the implement) toward the plowed ground, so that side draft forces are effectively resisted by the tail wheel.

In the past, parallel linkage means have been used to mount the tail wheel to the rearward end of the implement frame. When the tail wheel is lowered from a normal plowing position to a position for transporting the implement over a waterway, or the like, the tail wheel moves forwardly relative to the implement frame, and this movement shortens the distance between the tail wheel axle and the intermediate steering arm, which results in the increasing of the lead angle. This causes the implement to narrow in width in the transport position, so that when the implement is again lowered to the normal plowing position, the furrows being created by the ground working tools on the implement are laterally offset.

SUMMARY OF THE INVENTION

The improved tail wheel lift mechanism of the present invention obviates the problems discussed above by mounting the tail wheel assembly to the implement frame with a compensating linkage means which moves the tail wheel in a lead angle decreasing direction when the tail wheel is moved from the normal plowing position to the transport position. The compensating linkage means includes a pair of support arms of equal length which converge forwardly, with the forwardmost ends of the support arms being pivotally connected to the implement frame at vertically spaced, horizontally offset positions. With this arrangement the axis of the tail wheel axle moves from an upright disposition in the plowing position to a rearwardly inclined disposition in the transport position, and the pivotal connection between the tail wheel axle and the rearmost steering arm move slightly rearwardly to decrease and eliminate the tail wheel lead angle.

BRIEF DESCRIPTION OF THE DRAWINGS

FIGS. 1 and 1A are broken perspective views of a tillage implement in which the tail wheel structure of the present invention is incorporated;

FIG. 3 is a rear elevational view of the structure illustrated in FIG. 2.

DESCRIPTION OF THE PREFERRED EMBODIMENT

Figure 2:
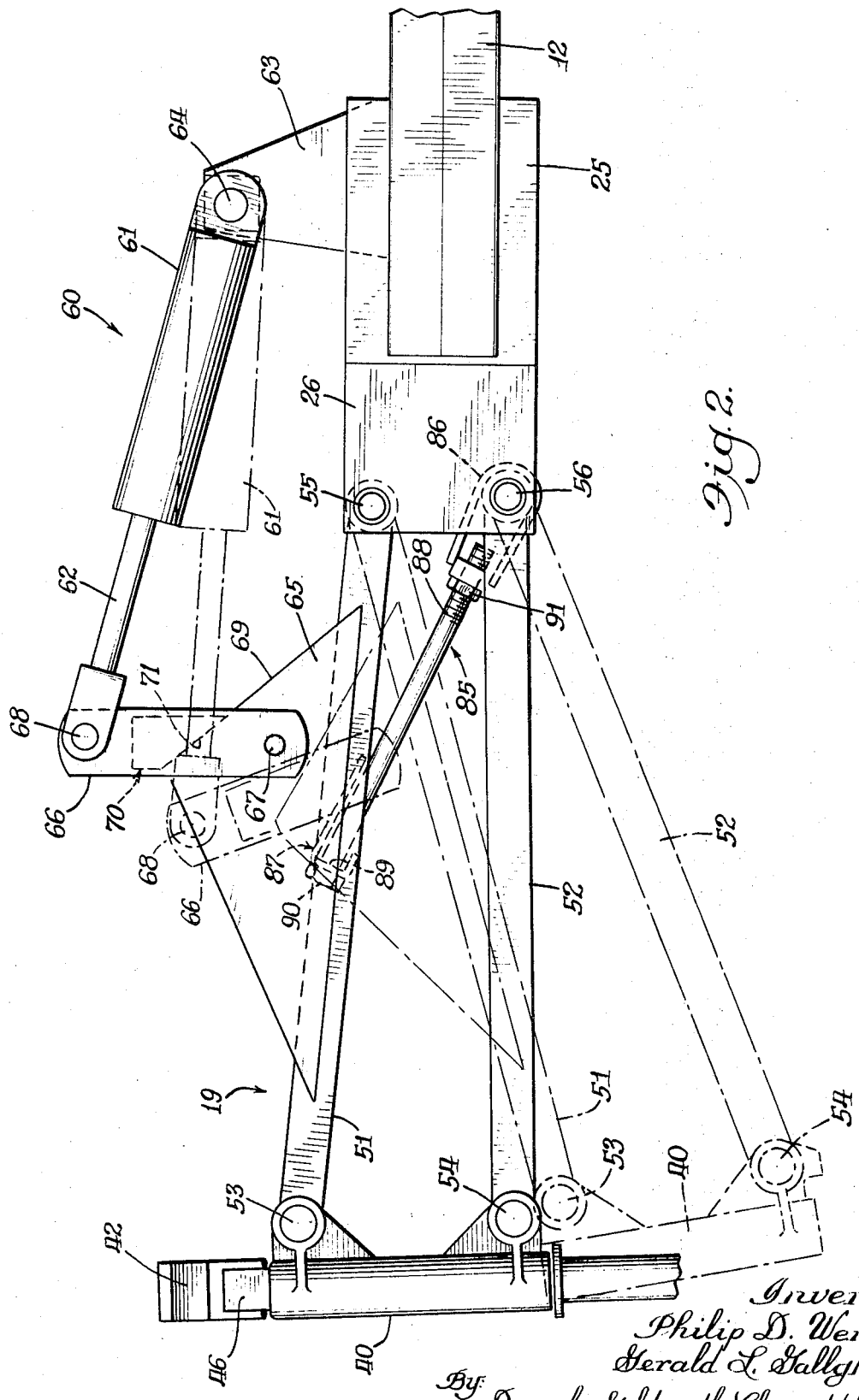
FIG. 2 is an enlarged fragmentary side elevational view, with certain elements broken away for clarity of illustration, and illustrating the tail wheel lift linkage in full lines in the normal plowing position, and in broken lines in the transport position.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings in detail, the tail wheel lifting mechanism of the present invention is illustrated in use with a mold board plow type of tillage implement 10, it being understood that the tail wheel lifting mechanism could be used with other types of ground working tools. The tillage implement 10 includes a frame structure having a hitch mechanism 11 at the forward end thereof for connection to a tractive vehicle, such as a tractor. The hitch mechanism can be either of the "on-land" or "in-furrow" type, as will be evident to those skilled in the art. An "in-furrow" hitch having particular utility in the environment of the present invention is disclosed and claimed in our commonly assigned U.S. Pat. application Ser. No. 763,108 filed concurrently herewith and entitled "Improved Hitch Mechanism" the disclosure of said application being incorporated herein in its entirety by this reference.

The frame structure includes a box frame member 12 that is disposed at an angle with respect to the direction of movement of the implement 10, as is well known. A longitudinally extending brace member 13 is secured to an intermediate portion of frame member 12, and extends forward therefrom. An inclined front frame member 14 is secured between the forwardmost portions of frame members 12 and 13.

The tillage implement includes a plurality of ground working tools, in the form of moldboard plow bottoms 15, which are mounted upon the implement frame structure, and which are movable relative thereto by safety trip means 16, which may take the form of that disclosed in our commonly assigned, concurrently filed U.S. Pat. application Ser. No. 763,109 entitled "Improved Trip Mechanism for Ground Working Implement" the disclosure of said application being incorporated herein in its entirety by this reference. As is described in the application mentioned immediately above, the ground working tools 15 are constantly urged toward an operating ground penetrating position by hydraulic cylinder means 17 for automatically returning the tools from a tripped position to the normal ground working position.

The implement 10 includes a steerable tail wheel 18 connected to the rearward end of frame member 12 by compensating linkage means 19 to be hereafter described in detail. A gage wheel 20 is also secured to the rearward end of frame member 12, as is well known. A front furrow wheel 21 is secured to the forwardmost end of frame member 12 by parallel linkage means 22, and wheel 21 is castered in a support sleeve 23 in a known manner. A hydraulic cylinder assembly 24 is provided for moving the front furrow wheel 21 between a plowing position, and a lowered transport position. Hydraulic cylinder means 24 may be synchronized with the hydraulic cylinder means to be hereafter described for moving tail wheel 18, although the tail wheel 18 and the front furrow wheel 21 may be separately actuated.

The means for mounting the tail wheel 18 upon the implement frame structure will be best understood from FIGS. 2 and 3. A generally rectangular mounting plate 25 is fixed to the rearwardmost end of frame member 12, as by welding or the like, and a further mounting plate 26 is bolted, or otherwise suitably secured, to mounting plate 25. An L-shaped mounting plate 27 includes a first leg 28 secured to plate 26 at right angles with respect thereto, with a further leg 29 of plate 27 being positioned in spaced, generally parallel relationship with respect to plate 26. Plate 27 cooperates with plate 26 to define a rearwardly opening support means for receiving the forwardmost portion of the linkage means that mounts the tail wheel 18 for movement relative to the implement frame.

The tail wheel 18 includes a rim 31 and a hub 32 that is rotatably mounted upon the end 33 and a generally upright axle shaft 34. As is evident from FIG. 3, the shaft end 33 is disposed at an obtuse angle with respect to the axle shaft 34, and the end 33 of the axle shaft is stepped to receive bearings 35—37 which journal the tail wheel 18 for rotation relative to the axle shaft. During a normal plowing operation the tail wheel 18 is positioned at a slight lead angle, in the range of 2° to 5°, in toward the plowed ground. A castellated nut 38 is provided on the outer end of shaft portion 33 to retain the hub 32 in assembled relation with the bearings 35—37 on the shaft portion 33.

The upper end of axle shaft 34 is journaled within a sleeve 40, and the uppermost end 41 of axle shaft 34 extends above sleeve 40, with shaft end 41 including opposite flattened faces 41a and 41b. A rear steering arm 42 includes a downwardly bent portion 44 that is secured in face abutting engagement with shaft face 41a by a bolt 45. Bolt 45 also secures a bracket 46 in face abutting engagement with face 41b of the axle shaft 34. The opposite end of support arm 42 is connected to steering means to be hereafter described.

Sleeve 40 is connected to the implement frame by the above-mentioned compensating linkage means 19 which takes the form of a pair of spaced support arms 51 and 52. The rearwardmost ends of arms 51 and 52 are pivotally connected at 53 and 54, respectively, to vertically spaced, forwardly facing portions of sleeve 40. The forwardmost ends of support arms 51 and 52 are pivotally connected at vertically spaced positions 55 and 56 between mounting plate 26 and the leg 29 of mounting plate 27. As is evident from FIG. 2, pivots 55 and 56 are spaced closer to one another than pivots 53 and 54, so that the support arms 51 and 52 converge forwardly. As is also evident from FIG. 2, pivot 56 is spaced forwardly of pivot 55. In the normal plowing position, illustrated in full lines in FIG. 2, support arm 52 is generally horizontally disposed, while support arm 51 is slightly upwardly inclined. In the preferred embodiment of the invention, support arms 51 and 52 have the same length, and the axle shaft 34 and sleeve 40 are positioned in a generally upright disposition in the normal plowing position. When the tail wheel 18 is lowered to the transport position, illustrated in broken lines in FIG. 2, support arms 51 and 52 are both downwardly inclined, and the axle shaft 34 and sleeve 40 are positioned in a rearward inclined disposition, with the pivotal connection of the shaft 34 to the steering arm 42 having been moved slightly rearwardly to eliminate the lead angle of tail wheel 18.

The present invention includes means 60 for moving the tail wheel 18 between the normal plowing position illustrated in full lines in FIG. 2, and the lowered, transport position illustrated in broken lines in FIG. 2. Tail wheel moving means 60 is defined by a hydraulic cylinder assembly 61 and a ram in the form of a piston rod 62 extending outwardly therefrom. A forward cylinder mounting bracket 63 is secured by beam 12, and the forwardmost end of cylinder 61 is pivotally mounted at 64 at the upper end of bracket 63. A bracket 65 is fixed to upper support arm 51, and bracket 65 is generally triangularly shaped, as can be seen in FIG. 2. The lower ends of a pair of laterally spaced actuating arms 66 are pivotally connected at 67 to bracket 65, and the rearward end of piston rod 62 is pivotally connected at 68 between the upper ends of actuating arms 66. Bracket 65 includes an upwardly and rearwardly inclined forwardly facing surface 69, and an abutment block 70 is fixed between actuating arms 66, with abutment block 70 including a downwardly and forwardly inclined abutment surface 71 that is movable into engagement with the forwardly facing surface 68 on bracket 65.

Cylinder 61 is connected to a source of fluid under pressure associated with the tractive vehicle, as is well known, and when it is desired to lower the tail wheel 18 to raise the implement 10 to a transport position, as when it is desired to pass over a waterway, fluid under pressure is placed in communication with cylinder 61 to force the piston rod 62 outwardly therefrom. The outward movement of piston rod 62 causes the abutment surface 71 on block 70 to bear against the forwardly facing surface 69 on bracket 65 and pivot support arms 51 and 52 in a counterclockwise direction about pivots 55 and 56 to the broken line position illustrated in FIG. 2.

The steering means for moving tail wheel 18 relative to the implement frame as the tractor turns will be best understood from FIGS. 1 and 1A. As is described in detail in our above-mentioned application entitled "Improved Hitch Mechanism", the hitch mechanism 11 includes an upright post 74 that is pivoted in response to turning movement of the tractor. A first, or forward, steering arm 75 has one end fixed to the upper end of post 74, and the opposite end of steering arm 75 is pivotally connected at 76 to the forwardmost end of a first steering link 77. Steering link 77 is in the form of an elongate pipe that extends at an angle with respect to frame member 12, and the rearwardmost end of steering link 77 is pivotally connected at 78 to the end of a second or central steering arm 79. The opposite end of central steering arm 79 is pivotally connected to a post 80 that extends upwardly from frame member 12. The forwardmost end of a second steering link 81 is also pivoted to central steering arm 79 at 78, with the rearward end of steering link 81 being pivotally connected at 82 to the rearward, or third, steering arm 42.

The present invention includes new and improved means 85 for controlling the depth of plow bottoms 15 in the normal plowing position of the implement, and to this end, a sleeve 86 is pivotally connected on the pivot 56 for the forwardmost end of lower support arm 52. A generally L-shaped bracket 87 is fixed to upper support arm 51, and a bolt 88 extends through an opening in a transverse portion 89 of bracket 87, with the head 90 of bolt 88 bearing against the outer surface of bracket portion 89. The shank of bolt 88 is freely slidably movable through bracket portion 89, and the position of bracket 87 relative to sleeve 86 may be adjusted by means of a nut 91 threadably received on the opposite end of bolt 88.

We claim:
1. A ground working implement comprising: a frame having a forward end and a rearward end; hitch means at the forward end of the frame for connecting the implement to a tractive vehicle; ground working means carried by said frame between said forward and rearward ends; means at the rearward end of said frame defining an axis; an axle mounted for pivotal movement about said axis; a ground engaging tail wheel rotatably mounted at the lower end of said axle, said tail wheel being disposed at a slight lead angle with respect to the direction of movement of said implement when the ground working means is in a normal ground engaging position; a steering arm pivotally connected to the upper end of said axle; steering linkage means connected between said hitch means and said steering arm for moving said axle and said tail wheel in response to movement of said tractor, the connection of said steering linkage means to said steering arm being spaced from the connection of said steering arm to said axle; means mounting said axis defining means for movement relative to said frame to move the frame and lift the ground working means from said normal ground engaging position to a transport position, said mounting means including compensating linkage means connected between said frame and said axis defining means for moving the connection between said steering arm and said axle relative to the connection between the steering arm and the steering linkage means during movement from the normal ground engaging position to the transport position to pivot the axle in a lead angle decreasing direction; and means connected between said frame and said axis defining means for moving the latter.

2. A ground working implement as set forth in claim 1 in which said axis defining means is disposed in a generally upright disposition when said ground working means is in the normal ground engaging position, and wherein said axis defining means is rearwardly inclined when said ground working means is in the transport position.

3. A ground working implement as set forth in claim 1 in which said compensating linkage means includes upper and lower support arms, each arm being pivotally connected at one end to said frame and at the other end to said axis defining means.

4. A ground working implement as set forth in claim 3 wherein the pivotal connection of said arms to said frame are closer together than the pivotal connection of said arms to said axis defining means, whereby said arms converge forwardly toward one another.

5. A ground working implement as set forth in claim 4 in which said upper support arm is upwardly and rearwardly inclined in the normal ground engaging position and is downwardly and rearwardly inclined in the transport position, and wherein said lower support arm is generally horizontally disposed in the normal ground engaging position and is downwardly and rearwardly inclined in the transport position.

6. A ground working implement as set forth in claim 5 wherein said upper and lower support arms are of equal length.

7. A ground working implement as set forth in claim 6 wherein the pivotal connections of said support arms to said frame are offset horizontally.